United States Patent
Kondou

(10) Patent No.: US 10,416,526 B2
(45) Date of Patent: Sep. 17, 2019

(54) OPTICAL WAVEGUIDE DEVICE

(71) Applicant: Sumitomo Osaka Cement Co., Ltd., Chiyoda-ku, Tokyo (JP)

(72) Inventor: Katsutoshi Kondou, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 14/674,874

(22) Filed: Mar. 31, 2015

(65) Prior Publication Data

US 2015/0277156 A1   Oct. 1, 2015

(30) Foreign Application Priority Data

Mar. 31, 2014 (JP) ................................ 2014-073535

(51) Int. Cl.
  *G02F 1/225* (2006.01)
  *G02F 1/035* (2006.01)

(52) U.S. Cl.
  CPC .......... *G02F 1/2255* (2013.01); *G02F 1/0356* (2013.01)

(58) Field of Classification Search
  CPC ...... G02B 206/1204; G02B 206/12061; G02F 1/035
  See application file for complete search history.

(56) References Cited

U.S. PATENT DOCUMENTS

| 5,473,711 A | 12/1995 | Hakogi et al. |
| 5,598,490 A | 1/1997 | Hakogi et al. |
| 5,949,925 A | 9/1999 | Seino |
| 6,198,855 B1* | 3/2001 | Hallemeier ............. G02F 1/035 385/2 |
| 7,245,788 B2* | 7/2007 | Fujita ...................... G02F 1/225 385/3 |
| 2007/0053625 A1* | 3/2007 | Ichioka ................ G02F 1/0311 385/2 |

(Continued)

FOREIGN PATENT DOCUMENTS

| JP | 2641238 | 5/1997 |
| JP | H11-084324 A | 3/1999 |

(Continued)

OTHER PUBLICATIONS

Guangyuan Li et al., "Analysis of the TE-Pass or TM-Pass Metal-Clad Polarizer With a Resonant Buffer Layer", Journal of Lightwave Technology, vol. 26, No. 10, pp. 1234-1241, May 15, 2008.

(Continued)

*Primary Examiner* — Sung H Pak
*Assistant Examiner* — Hoang Q Tran
(74) *Attorney, Agent, or Firm* — Greer, Burns & Crain, Ltd.

(57) ABSTRACT

An object of the invention is to provide an optical waveguide device which is able to efficiently absorb or remove leaked light propagating in a substrate. An optical waveguide device in which an optical waveguide is formed on a substrate, in which the optical waveguide includes a main waveguide through which signal light propagates, and a metal layer (a bonding layer or an electrode) is formed, through a high refractive index layer having a refractive index higher than the refractive index of the substrate, in at least a part of a region on which the main waveguide is not formed.

10 Claims, 18 Drawing Sheets

(56) References Cited

U.S. PATENT DOCUMENTS

| | | | | |
|---|---|---|---|---|
| 2009/0324163 A1* | 12/2009 | Dougherty | ............ | B82Y 20/00 |
| | | | | 385/14 |
| 2010/0232736 A1* | 9/2010 | Ichikawa | ............ | G02F 1/0356 |
| | | | | 385/2 |
| 2012/0207425 A1 | 8/2012 | Kondou | | |
| 2013/0195400 A1 | 8/2013 | Miyazaki et al. | | |

FOREIGN PATENT DOCUMENTS

| | | |
|---|---|---|
| JP | 3628342 | 12/2004 |
| JP | 2006-065044 A | 3/2006 |
| JP | 2006-301612 | 11/2006 |
| JP | 2008-089875 | 4/2008 |
| JP | 2011-075906 | 4/2011 |
| JP | 4719135 | 4/2011 |
| JP | 4782213 | 7/2011 |
| JP | 2012-078507 | 4/2012 |
| JP | 2012-078508 | 4/2012 |
| JP | 2012-176628 | 8/2012 |
| JP | 2012-215901 | 11/2012 |
| JP | 2014-035451 | 2/2014 |
| WO | WO2014/024957 A1 | 2/2014 |

OTHER PUBLICATIONS

H. A. Jamid et al., "TM-Pass Polariser Using Metal-Clad Waveguide With Index Buffer Layer", Electronics Letters, vol. 24, No. 4, pp. 229-230, Feb. 18, 1988.

* cited by examiner

OPTICAL WAVEGUIDE DEVICE

The present application claims priority over Japanese Application JP 2014-073535, filed on Mar. 31, 2014, the contents of which are hereby incorporated into this application by reference.

BACKGROUND OF THE INVENTION

Field of the Invention

The present invention relates to an optical waveguide device, and in particular, relates to an optical waveguide device which is able to efficiently remove stray light propagating through a substrate.

Description of Related Art

In optical communication or optical information processing, various optical waveguide devices such as an optical modulator are used. A waveguide type LN modulator using a substrate of lithium niobate (LN) or the like having an electro-optic effect has a small wavelength chirp and is able to perform phase and intensity modulation, and thus is used as a multi-level modulator such as a DQPSK modulator, a DP-QPSK modulator, and a QAM modulator.

In an intensity modulator of the related art, a driving voltage applies a voltage (V$\pi$) changing from an On state to an Off state, but in an optical modulator such as the multi-level modulator using an optical phase, it is necessary to modulate the phase from $\pi$ to $-\pi$, and 2V$\pi$ of the driving voltage is necessary. In order to reduce a load of a drive circuit (a driver) of the optical modulator, it is necessary to decrease the driving voltage of the optical modulator to half.

In addition, a changeover from intensity modulation to multi-level modulation is the purpose to increase transmission capacity, and thus it is necessary to decrease the driving voltage without degrading optical (response) bandwidth. However, the driving voltage and the optical bandwidth have a contradictory relationship (refer to Japanese Examined Patent Application Publication No. H7-50265), and thus even if a technology of the related art is used, it is difficult to realize a decrease in the driving voltage and an increase in the bandwidth.

As a method of realizing a decrease in the driving voltage and an increase in the bandwidth, a method of forming a ridge structure on the surface of an LN substrate, or a method of thinning the LN substrate is proposed.

When the thickness of the LN substrate is thinned to the extent of a light distribution, a microwave electric field and an optical waveguide efficiently overlap each other, and thus it is possible to decrease the driving voltage. In addition, it is possible to decrease a dielectric loss cursed by LN, and thus it is possible to improve the optical bandwidth by reducing a microwave loss.

On the other hand, leaked light from an optical connection portion between a fiber and an LN chip configuring an optical waveguide device or an optical waveguide, and unnecessary light such as radiation light radiated from a Y-junction of the optical waveguide at the state of extinction, or the like propagates through the LN substrate. The LN substrate is thinned, and a cross-sectional area of the LN substrate decreases, and thus a peak of the optical intensity becomes larger. That is, it is known that it makes difficult to control a bias point of the optical modulator because the extinction ratio caused by recombining stray light to optical waveguide is degraded caused by increasing the average optical intensity of stray light or the like against the optical intensity of light wave propagating through the substrate or the stray light is mixed into a photo detector (PD) for control.

In the optical modulator having a thin substrate structure, as a method of removing the stray light (the leaked light), the following technologies are proposed.

(1) An optical absorption material (metal) is arranged in a region other than the vicinity of the optical waveguide (refer to Japanese Laid-open Patent Publication No. 2006-276518, Japanese Laid-open Patent Publication No. 2006-301612, and Japanese Laid-open Patent Publication No. 2012-078507).

(2) A through hole is formed in the thinned LN substrate (a clad portion) (refer to Japanese Laid-open Patent Publication No. 2006-276518 and Japanese Laid-open Patent Publication No. 2006-301612).

(3) A 3-branch structure or a residual high order mode removing function is applied to the Y-junction of the optical waveguide (refer to Japanese Laid-open Patent Publication No. 2011-075906).

(4) The 3-branch structure is applied to the Y-junction of the optical waveguide, and a method of guiding light propagating through a subsidiary waveguide to the outside is adopted (refer to Japanese Laid-open Patent Publication No. 2012-078508 and Japanese Laid-open Patent Publication No. 2012-215901).

(5) A method of terminating (absorbing or ejecting) the leaked light from a branched point of a Y-branched portion of the optical waveguide is adopted (refer to Japanese Patent Application No. 2012-176628 (Filing Date: Aug. 9, 2012)).

Next, a forming method of the LN modulator using the thin substrate of the technologies of the related art and metal absorption of the leaked light will be described.

The forming method of the LN modulator using the thin substrate is as follows.

A back surface of an X-cut LN wafer on which a Ti diffused waveguide is formed is thinned to approximately 10 $\mu$m by a polishing equipment (CMP) or the like. In a Ti diffusion step, thin substrate processing, or the like, a conventional technology is able to be used.

An electrode of the optical modulator may be formed before the LN substrate is thinned or may be formed after the LN substrate is thinned. In addition, when only an interaction area of the electrode is thinned, masking is formed on the back surface of the substrate, and then the thinning is able to be performed by a wet etching method, a dry etching method, a sandblasting method, or further more laser processing using an excimer laser or the like.

The thinned LN wafer is fixed to a holding substrate with an adhesive agent. After that, in order to form the electrode by using electroplating, a plating seed layer is formed on the surface of the thinned LN substrate through a bonding layer by using vacuum vapor deposition or the like. It is necessary that the electrode of the optical modulator adheres by metal to a dielectric material or a semiconductor. In addition, it is required that a material of the electrode is a material by which the electrode is not deformed (Migration) due to apply electric current and does not cause a solid phase alloy reaction with other materials or the like.

For this reason, a two-layer structure having the bonding layer between the electrode and the LN substrate is used. In the bonding layer (a metal layer), titanium, chromium, or the like which is disclosed in Japanese Patent No. 3628342 is used. That is, when the electrode material is gold, titanium and gold, chromium and gold, and the like are included therein, and when the electrode material is copper, titanium and copper, chromium and copper, and the like are included therein. After the seed layer is formed, the electrode is formed by a semi-additive method using electroplating. A cross-sectional shape of the LN modulator having a thin substrate structure is illustrated in FIG. 1.

A method of absorbing the leaked light propagating through the substrate by metal will be described. The leaked light from the optical waveguide slab-propagates in the LN substrate (the clad portion). This phenomenon particularly remarkably occurs in the thinned substrate. In the past, a minimum extinction ratio is ensured by a method of absorbing the slab-propagated light using a part of the electrode configuring the optical modulator, or a method of disposing a dedicated guide (a waveguide or the like) for the leaked light and guiding the leaked light to a portion under the electrode.

On the other hand, when the optical modulator is changed from the intensity modulator to the multi-level modulator, inside the LN modulator chip using the thin substrate, a light leaked portion (for example, as the light leaked portion, the optical connection portion (connection between the chip and the fiber, or the like), a bending waveguide (in particular, when a curvature radius is small), the Y-branched portion, and the Y-junction (in principle, leaked light occurs) are included.) increases, and thus the extinction ratio is more easily degraded. In addition, when multi-level is used, a high extinction ratio greater than or equal to that of the intensity modulator is required, and thus it is not able to support to this requirement using only the conventional technology.

A result of preliminarily calculating the amount of light absorption by using the electrode (the bonding layer or the metal layer) in the light slab-propagating through the thinned LN substrate is illustrated in FIG. 2. In FIG. 2, the thickness of the LN substrate is 9.0 µm, the bonding layer (the metal layer) is made of titanium (Ti: a refractive index n and an extinction coefficient k with respect to the light waves of 1.55 µM are n=4.05358 and k=3.81057), and the electrode material is gold (Similarly, Au: n=0.56043 and k=11.2475).

The light slab-propagating in the LN substrate is in contact with the titanium of the bonding layer, and thus a relationship between the thickness of a titanium film and a propagation loss of the slab-propagated light becomes important. In addition, the LN substrate is rather thick as the optical waveguide and functions as a multi-mode waveguide, and a propagation loss of low order mode light ($\lambda$=1.55 µm, and a TE mode) is illustrated in the graph. In a 0-order mode (n=0), a hopping in the graph of the titanium film at a thickness of 0.11 µm occurs due to changing the mode of the LN substrate to a mode having the titanium film as a core. That is, the electric field profile of the 0-order mode (n=0) is shifted in the titanium film. Similarly, in a first mode (n=1), one peak of the electric field profile penetrates into the titanium film, and the other peak is in the LN substrate.

It is understood that higher order mode light has larger amount of light away from the LN substrate so that it increases propagation loss. On the other hand, the thickness of the titanium film is set to be 0.07 µm or more, and thus in a mode where the number of peaks of the electric field profile in the LN substrate is one, a metal absorption loss (the propagation loss) of 4 dB/cm is able to be obtained. The metal absorption loss is a constant value even when the thickness of the titanium film is 0.2 µm or more. In the metal absorption performed by using the titanium film, using only the metal absorption of the titanium film or the like, it is not possible to sufficiently respond to a situation where a great deal of leaked light is generated due to a complicated optical waveguide such as the multi-level modulator.

On the other hand, the light absorption using metal is used as a polarizer. In particular, a polarizer is developed in which a metal film is disposed onto the optical waveguide directly or through a low refractive index film, and thus light of a TM mode is absorbed. However, in the absorption by metal in this method, it is known that light of the TE mode is not likely to be absorbed. For this reason, a TE mode absorption type polarizer is developed in which a high refractive index film is inserted between the optical waveguide and the metal film (refer to H. A. JAMID et al., "TM-PASS POLARISER USING METAL-CLAD WAVEGUIDE WITH INDEX BUFFER LAYER", Electronics Letters, Vol. 24, No. 4, pp 229-230, February 18 (1988), and Japanese Patent No. 2641238). However, when the configuration of this polarizer is applied to the LN substrate, it makes the problem that an insertion loss increases.

In order to achieve both a low insertion loss and absorption of unnecessary polarized light, a method of inserting a low refractive index thin film between the high refractive index film and the substrate is proposed (refer to Guangyuan Li et al., "Analysis of the TE-Pass or TM-Pass Metal-Clad Polarizer With a Resonant Buffer Layer", Journal of Lightwave Technology, Vol. 26, No. 10, pp 1234-1241, May 15 (2008)).

In addition, in an integrated modulator such as a DP-QPSK modulator, downsizing of the entire chip is required. In order to downsize the chip, it is necessary to make a curvature radius of a bending portion or the Y-branched portion of the optical waveguide shorter. When the curvature radius makes shorter, a refractive index of the waveguide is drastically changed against a light propagation direction, and thus the leaked light increases, and it is necessary to further remove the stray light or the like.

In addition to the light absorption by metal, there is a method of forming a through hole in the substrate described above, but the chip is easily broken, and reliability as an optical waveguide device is degraded. In addition, when the optical waveguide (including the high refractive index film) guiding the leaked light is disposed, a processing method of termination of the optical waveguide becomes problematic. Obviously, it is not possible to guide the entirety of the leaked light with the optical waveguide.

In the light absorption by metal, a case where the polarization of the light waves input to the LN modulator is TE mode, it comes up more difficult problem. That is, an absorption effect of the TE mode light by the metal film is lower than an absorption effect of the light in the TM mode by approximately double digits. It is necessary that the minimum extinction ratio of a commercially available optical modulator is generally 25 dB or more. In contrast, considering the length of a Y multiplexing and demultiplexing portion of the chip in the LN modulator is approximately 1 cm, it is not possible to sufficiently perform the light absorption using only the metal film.

SUMMARY OF THE INVENTION

An object of the invention is to solve the problems described above and to provide an optical waveguide device which is able to efficiently absorb and remove leaked light propagating in a substrate.

In order to solve the problems described above, an optical waveguide device of the invention has the following technical features.

(1) In an optical waveguide device in which an optical waveguide is formed on a substrate, the optical waveguide includes a main waveguide in which signal light propagates, and a metal layer is formed, through a high refractive index layer having a refractive index higher than the refractive index of the substrate, in at least a part of a region in a surface of the substrate on which the main waveguide is not formed.

(2) In the optical waveguide device according to (1), a control electrode for controlling light waves propagating in the main waveguide is formed on the metal layer.

(3) In the optical waveguide device according to (1) or (2), a part of the metal layer is arranged in a part of a region on which the main waveguide is formed not through the high refractive index layer.

(4) In the optical waveguide device according to any one of (1) to (3), the film thickness of the substrate is 200 μm or less.

(5) In the optical waveguide device according to any one of (1) to (4), the substrate is configured of a material having an electro-optic effect.

(6) In the optical waveguide device according to any one of (1) to (5), a low refractive index layer having a refractive index lower than the refractive index of the substrate is arranged between the substrate and the high refractive index layer.

(7) In the optical waveguide device according to (6), the low refractive index layer satisfies the following conditions.

$$(n_{low} \cdot t_{low})/\lambda \leq 0.45$$

$n_{low}$ is the refractive index of the low refractive index layer, $t_{low}$ is a film thickness of the low refractive index layer (a unit of μm), and $\lambda$ is the main wavelength (a unit of μm) of the light waves propagating through the main waveguide.

Here, the high (low) refractive index is defined with respect to a material of which an extinction coefficient is able to be ignored. In addition, a material of which an extinction coefficient is not able to be ignored is defined as metal.

According to the optical waveguide device of the invention, in the optical waveguide device in which the optical waveguide is formed on the substrate, the optical waveguide includes the main waveguide in which the signal light propagates, and the metal layer is formed, through the high refractive index layer having the refractive index higher than the refractive index of the substrate, in at least a part of the region in the surface of the substrate on which the main waveguide is not formed, and thus it is possible to efficiently absorb and remove the leaked light propagating through the substrate, and it is possible to improve optical properties of the optical waveguide device such as an extinction ratio.

BRIEF DESCRIPTION OF THE DRAWINGS

FIG. 5A illustrates a case where the film thickness of the high refractive index layer is 0.06 μm, and FIG. 5B illustrates a case where the film thickness of the high refractive index layer is 0.16 μm.

FIG. 14A illustrates a pattern state of the optical waveguide and silicon (the high refractive index layer), and FIG. 14B illustrates a state where the pattern of both the bonding layer and the electrode pattern imposes with the pattern of FIG. 14A.

DETAILED DESCRIPTION OF THE INVENTION

Hereinafter, an optical waveguide device of the invention will be described in detail by using preferred examples.

Figure 1:
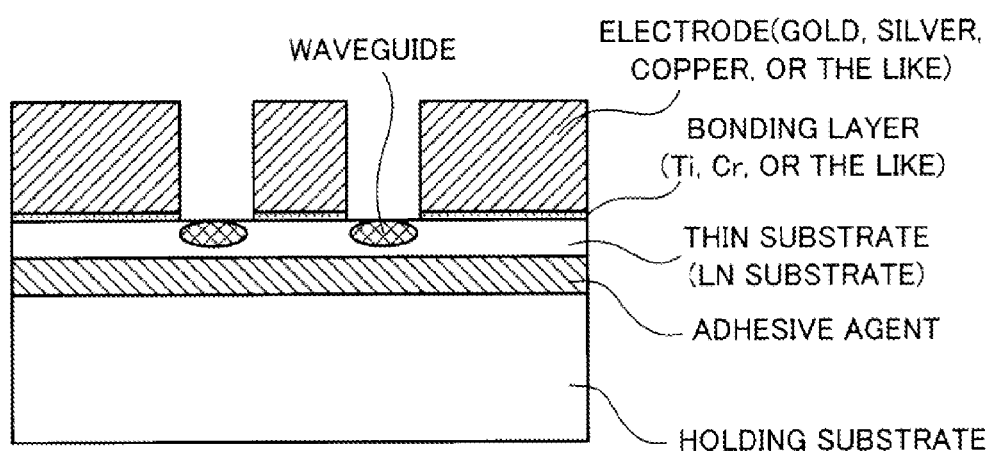
FIG. 1 is a cross-sectional view illustrating an example of an optical waveguide device of the related art.
Figure 2:
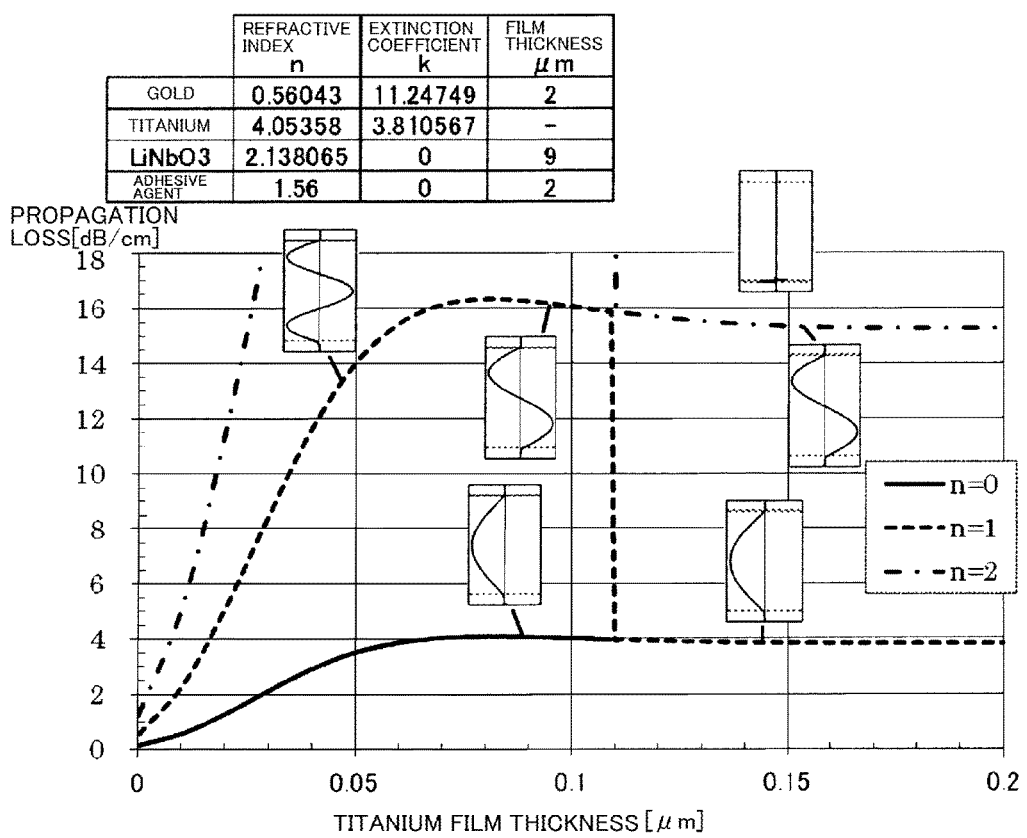
FIG. 2 is a graph illustrating a change of a propagation loss with respect to the thickness of a titanium film in a structure where the titanium film and a gold electrode are deposited on a thinned LN substrate.
Figure 3:
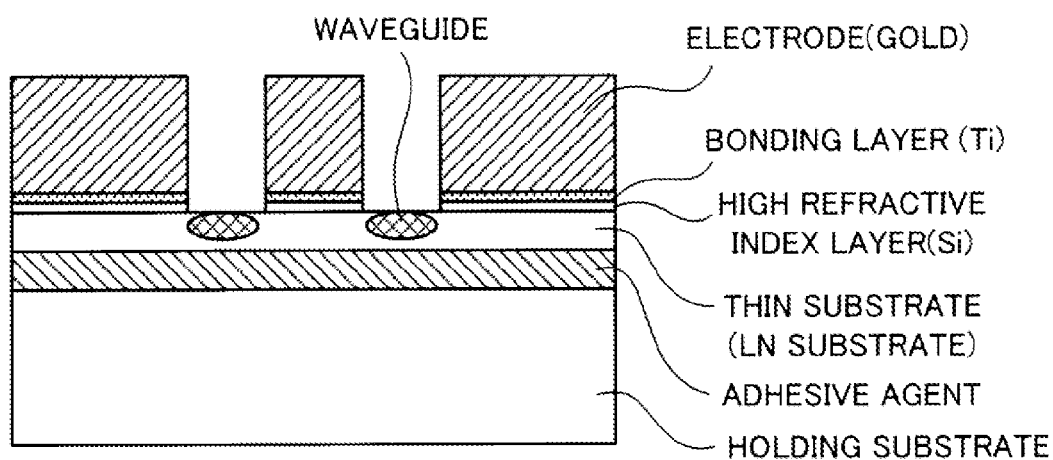
FIG. 3 is a cross-sectional view illustrating an example of an optical waveguide device of the invention.

As illustrated in FIG. 3, according to the optical waveguide device of the invention, in the optical waveguide device in which an optical waveguide is formed on a substrate, the optical waveguide includes a main waveguide in which signal light propagates, and a metal layer is formed, through a high refractive index layer having a refractive index higher than a refractive index of the substrate, in at least a part of a region on a surface of the substrate in which the main waveguide is not formed.

The "surface of the substrate" in the invention does not indicate only a surface of the substrate on a side where the optical waveguide is formed, and may be any one of a surface opposite to the surface on which the optical waveguide is formed, and a side surface of the substrate.

As the substrate, a substrate having an electro-optic effect, such as lithium niobate, lithium tantalate, or the like, and a semiconductor substrate, or the like are able to be used.

As a forming method of the optical waveguide, for example, a high refractive index substance such as titanium (Ti) is formed on a LiNbO$_3$ substrate (an LN substrate) by thermal diffusion. In addition, the optical waveguide is able to be formed by forming concavities and convexities in the substrate like a ridge type waveguide.

In the optical waveguide device of the invention, the thickness of the substrate is not particularly limited, and when a substrate of 200 μm or less, in particular, a substrate of 20 μm or less is used, stray light such as leaked light is confined within the substrate, and thus it is more preferable that an optical absorption film of the invention is used. As a method of thinning the substrate or a method of forming a control electrode or the like on the substrate, various methods described in the technology of the related art are able to be used.

In the optical waveguide device of the invention, a light of TE mode propagating in the substrate on which the optical waveguide is formed like LN substrate, in particular, a thinned substrate, using the substrate as a core, is efficiently absorbed in the metal layer, and thus the high refractive index layer is interposed between the substrate and the metal layer (such as the electrode). Here, the "high refractive index" indicates that the refractive index is higher than the refractive index of the substrate (corresponding to a clad of the optical waveguide).

The high refractive index layer indicates a layer having a refractive index higher than the refractive index of the substrate, and specifically, silicon, titanium oxide, copper oxide, and the like are able to be used. In addition, the metal layer may be a part of metal configuring the electrode, or may be an bonding layer of metal used for bonding the electrode to the substrate. As the bonding layer, metal such as titanium, nickel, and aluminum or an alloy thereof are able to be used.

When polarization of main light waves propagating through the optical waveguide formed on the substrate uses the TE mode, a stray light (leaked light) removing method used in the invention is particularly effective. The light waves of the TE mode are often used in an optical waveguide device using an X-cut LN substrate with a thin substrate structure. Here, the thin substrate primarily indicates a substrate having a thickness of 20 μm or less, and the stray light removing method of the invention is able to be applied to various optical waveguide devices regardless of the thickness of the substrate, and in particular, a substrate of 200 μm or less is more effective.

Hereinafter, the thinned substrate, specifically, the LN substrate having a thickness of 9.0 μm will be primarily described. Furthermore, a process before a thinned LN wafer with optical waveguide is fixed to a holding substrate by an adhesive agent will be omitted specific description because it is possible to be performed by the same method as that in the technology of the related art.

Next, as the high refractive index film, silicon (Si: a refractive index with respect to 1.55 μm is n=3.485674, and an extinction coefficient is k=0) is formed by sputtering, and the thickness thereof is 0.11 μm. After that, as a bonding seed layer (the metal layer), titanium and gold are vapor deposited, and layers of titanium having a film thickness of 0.10 μm and gold having a film thickness of 0.05 μm are formed. Using the formed seed layer as an electrode of electro plating, a gold electrode is formed by a semiadditive method. Here, silicon remains after the bonding seed layer between the electrodes is removed, and thus the silicon between the electrodes is removed with a suitable chemical agent (KOH or the like). In at least a portion between the electrodes in which the waveguide exists, it is necessary that the silicon of the high refractive index film should be removed. A part of a cross-sectional shape of the formed optical waveguide device is illustrated in FIG. 3.

Figure 4:
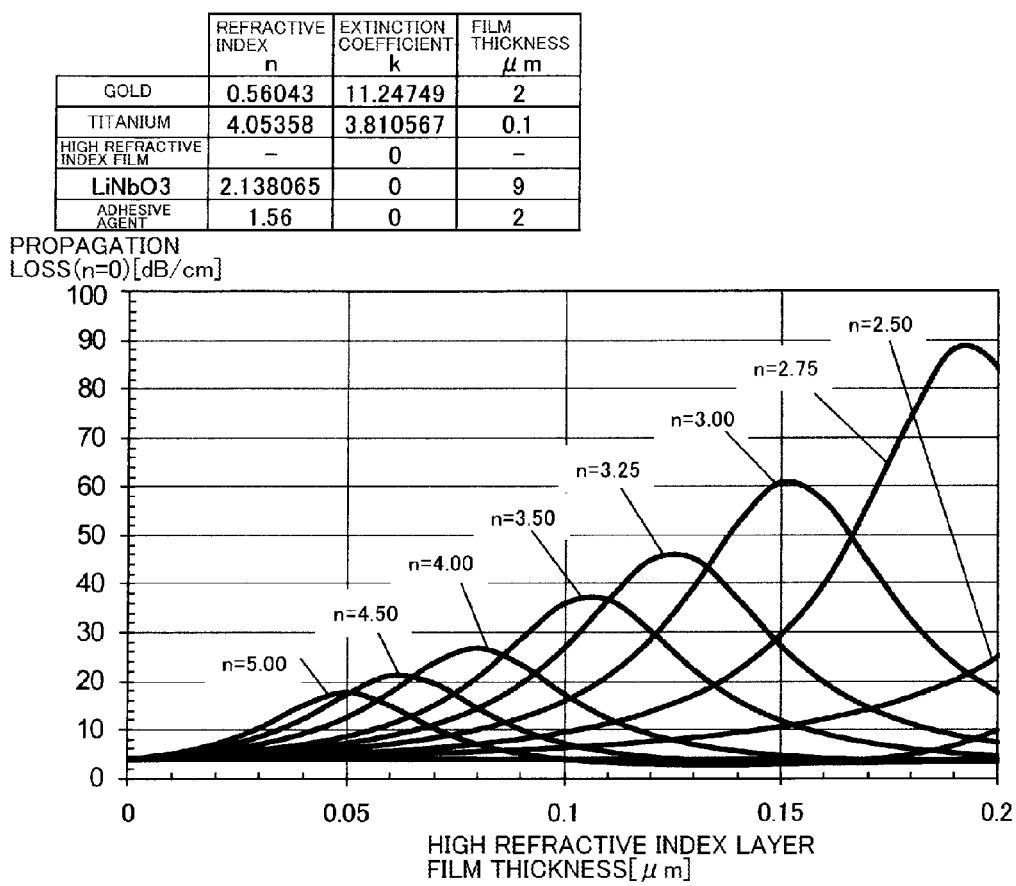
FIG. 4 is a graph illustrating a change of a propagation loss with respect to the film thickness of a high refractive index layer when the refractive index of the high refractive index layer arranged between an LN substrate and a titanium film is changed.
Figure 5A:
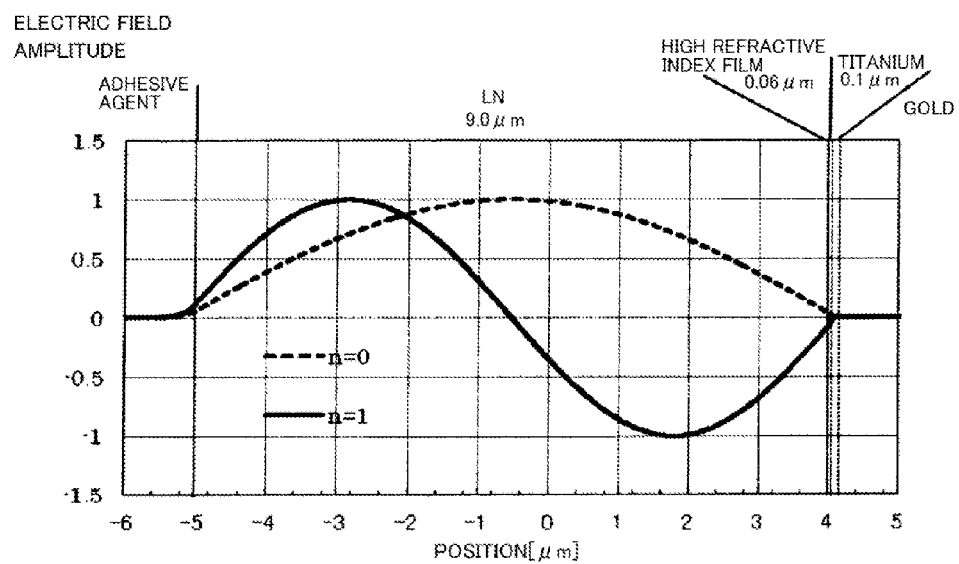
FIGS. 5A and 5B illustrate a light distribution ($\lambda$=1.55 μm, TE mode) when the high refractive index film has a refractive index of n=3.5.
Figure 5B:
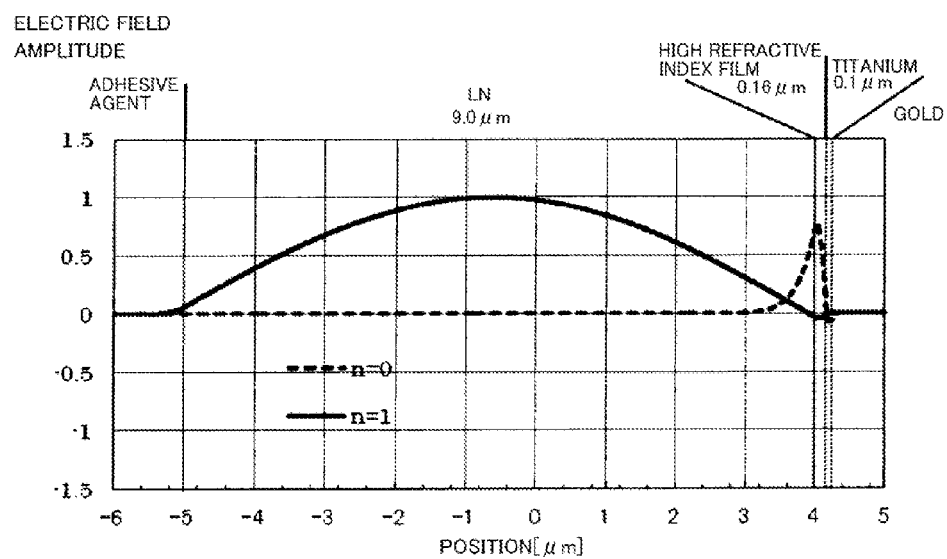

A propagation loss using titanium as the bonding layer (the metal layer) and gold as the electrode is calculated. The thickness of a Ti film is fixed at 0.10 μM, and the thickness of the LN substrate is fixed at 9.0 μm, the refractive index of the high refractive index layer is changed from 2.5 to 5.0, and the propagation loss with respect to a mode in which the number of peaks of an electric field intensity distribution of light (1550 nm, TE mode) propagating in the LN substrate is one is preliminarily calculated (refer to FIG. 4). A representative electric field profile at this time is illustrated in FIGS. 5A and 5B. FIGS. 5A and 5B are light distributions (λ=1.55 μm, TE mode) when the refractive index of the high refractive index film is n=3.5. FIG. 5A illustrates the high refractive index film having a thickness of 0.06 μm, and FIG. 5B is the high refractive index film having a thickness of 0.16 μm. When the high refractive index film is thickened, the light distribution is pulled to the high refractive index film side.

From the calculation result, when the bonding layer/the electrode is Ti/Au, the following is found out.

(1) The maximum value of the propagation loss becomes smaller when the refractive index of the high refractive index film becomes higher.

(2) The film thickness at which the propagation loss has the maximum value becomes thinner when the refractive index of the high refractive index film becomes higher.

* The peak of the propagation loss periodically appears with respect to a high refractive index film thickness (refer to Japanese Patent No. 2641238).

(3) Full Width Half Maximum (FWHM) becomes narrower when the refractive index of the high refractive index film becomes higher.

Figure 6:
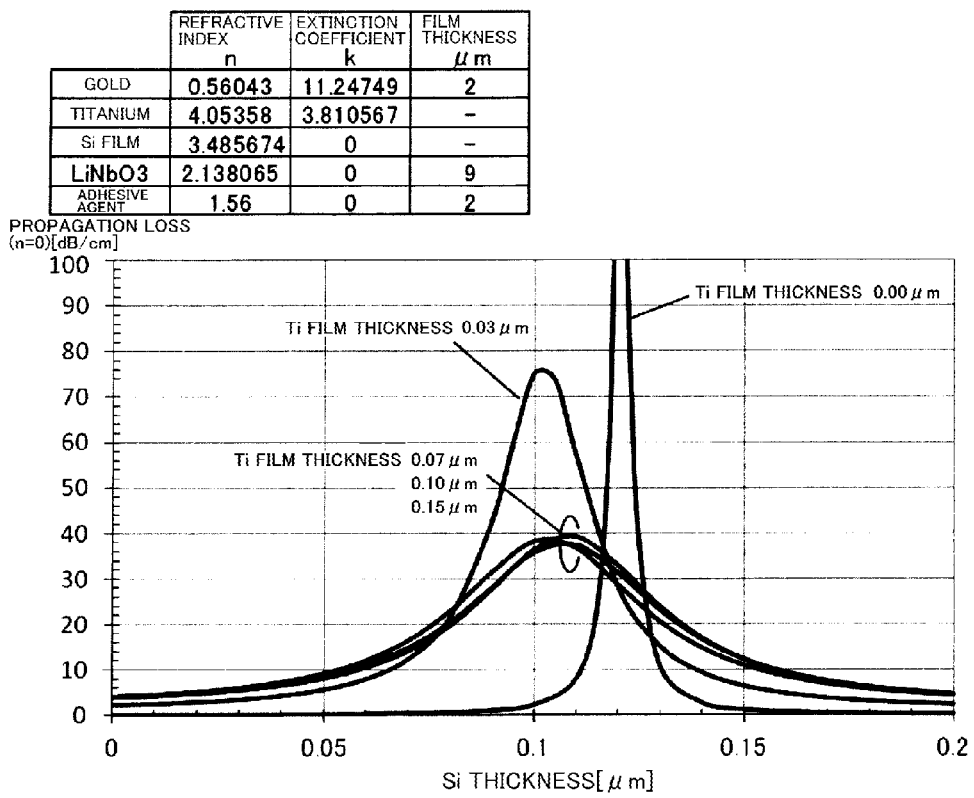
FIG. 6 is a graph illustrating a change of a propagation loss when each film thickness of titanium (a bonding layer or a metal layer) and silicon (the high refractive index layer) is changed.

Further, dependence with respect to the thickness of a titanium film in case the high refractive index film is silicon is investigated (refer to FIG. 6). In FIG. 6, the high refractive index film (silicon) and gold are fixed onto the thinned LN substrate, a titanium film thickness and a silicon film thickness are changed, and the propagation loss in the LN substrate is preliminarily calculated. The light has a wavelength of $\lambda=1.55$ μm, and is TE mode.

From the result, the silicon film thickness at which the propagation loss is maximized becomes constant so that the maximum value of the propagation loss becomes not to depend on the titanium film thickness when the titanium film thickness is 0.07 μm or more. In addition, the maximum value becomes lower and FWHM becomes wider when the titanium becomes thicker. Even in a state where the titanium film thickness is sufficiently thick, the propagation loss is considerably improved from 4 dB/cm to 40 dB/cm by inserting the high refractive index film. In addition, it is assumed that wavelength dependence would be also small as FWHM (0.055 μm) is wide.

Figure 7:
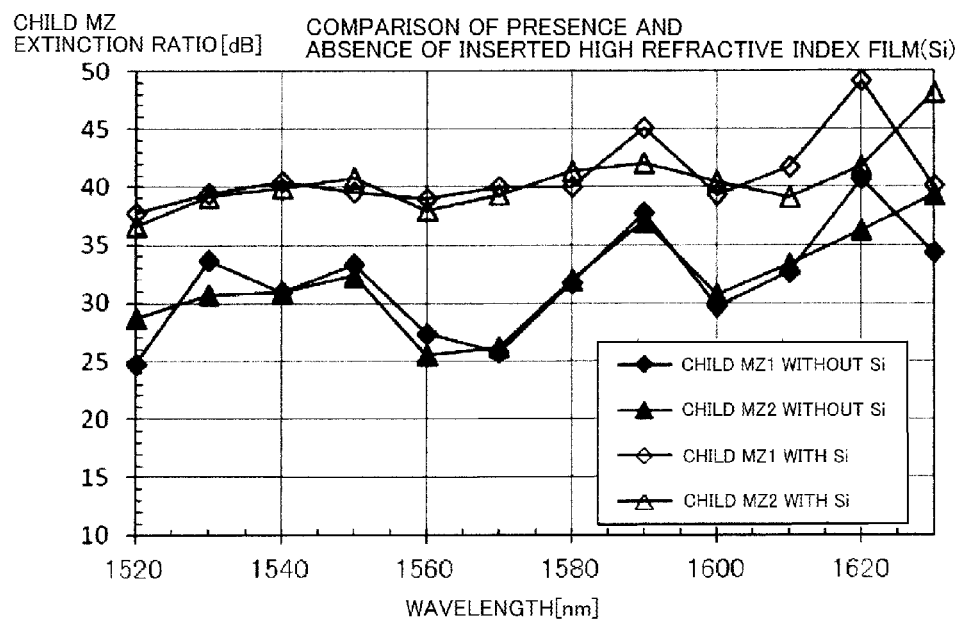
FIG. 7 is a graph illustrating a result of measuring an extinction ratio in a sub Mach-Zehnder type waveguide (a child MZ) by changing the wavelength of incident light waves in a QPSK modulator in case of having or not having the high refractive index layer (Si).

Next, a QPSK modulator is prepared in which the silicon film is inserted under portion of the electrode configuring a signal and ground electrode. An extinction ratio is evaluated together with a modulator for comparison (silicon is not inserted) (refer to FIG. 7). The thickness of the LN substrate, the silicon film, and the titanium film are 9.0 μm, 0.11 μm, and 0.10 μm, respectively. The extinction ratio is measured with respect to each output of two sub Mach-Zehnder type waveguides (child MZ 1 and 2). As a result, by inserting the silicon film between the thinned LN substrate and the electrode, the extinction ratio is improved by 10 dB.

The reason for using silicon as the high refractive index film is because of an effect therein of removing the stray light, the ease of manufacturing (ease of forming a pattern, film thickness control properties, a variation in the refractive index, and the like), reliability (a film bonding force, physical stability), and the like. In addition, as the high refractive index film, titanium oxide ($TiO_2$: n=2.71@1.55 μm), copper oxide (CuO: n=2.56@1.55 μm), or the like may be used. Furthermore, an etchant of titanium oxide is limited to a hydrofluoric acid, a hot concentrated sulfuric acid, or the like, and is incompatible with a manufacturing method in which the high refractive index film between the electrodes is removed by using the electrode as a mask. In addition, there is also a problem that copper oxide is required to make a film thickness thicker.

Furthermore, even when titanium on titanium oxide is changed to chromium (Cr: n=4.19, and k=4.92@1.55 μm), the complex refractive index remains approximately the same, and thus the same result is obtained.

Figure 8:
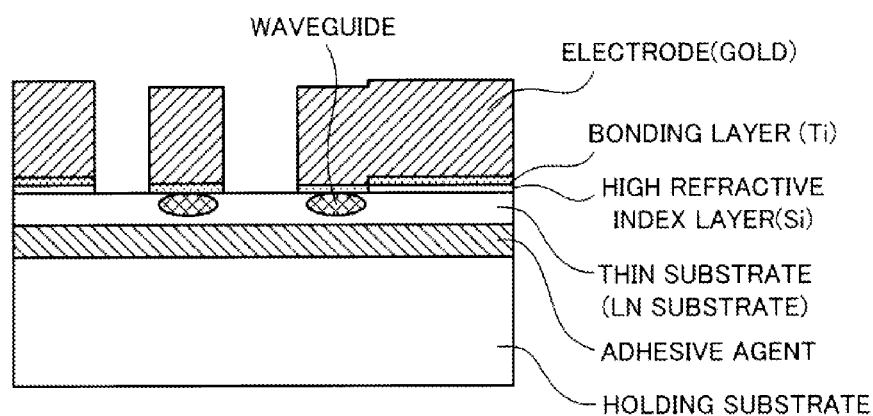
FIG. 8 is a cross-sectional view illustrating an example in which the bonding layer (the metal layer) and an electrode are formed after the high refractive index film is patterned.

In the optical waveguide device described above, an unnecessary portion (on the waveguide or the like) of the high refractive index layer is removed by using the electrode as a mask, but the configuration is not limited thereto. For example, when it is difficult to perform chemical etching, the high refractive index film (titanium oxide or the like) described above is formed by using a lift-off method, and then the bonding layer (the metal layer) and the electrode are able to be formed. Similarly, it is not necessary that the metal covering the high refractive index film is the same material as that of the electrode. In FIG. 8, a cross-sectional shape of an example is illustrated in which the optical waveguide device is prepared by forming the electrode after the high refractive index film is patterned. Thus, a part of the metal layer is able to be configured to be arranged without the high refractive index layer in a part of the region where the main waveguide is formed.

EXAMPLE 1

Figure 9:
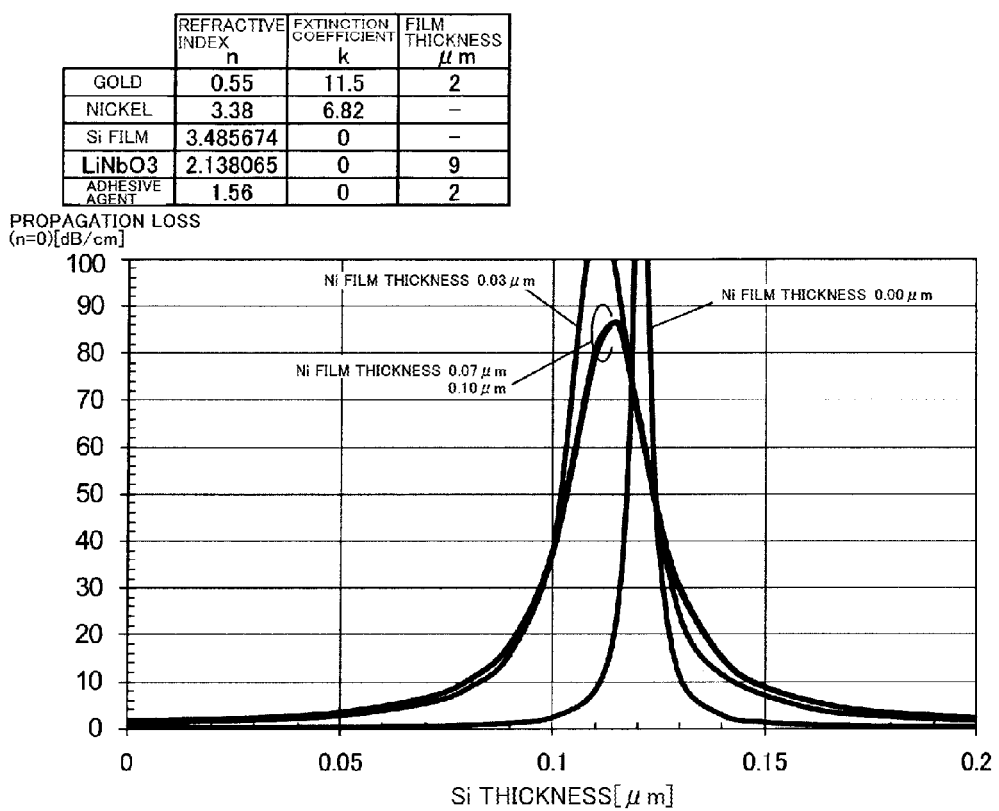
FIG. 9 is a graph illustrating a change of a propagation loss when each film thickness of nickel (the bonding layer or the metal layer) and silicon (the high refractive index layer) is changed.

The bonding layer (the metal layer) of FIG. 3 is changed from titanium to nickel (Ni: n=3.38, and k=6.82@1.55 μm), the high refractive index layer is silicon, the thickness of the LN substrate is fixed at 9.0 μm, and a propagation loss with respect to a mode in which the number of peaks of the electric field intensity distribution of the light (1550 nm, and the TE mode) propagating in the LN substrate is one is preliminarily calculated. A result thereof is illustrated in FIG. 9. As a result thereof, the peak is 85 dB/cm and improved by double compared to the case where the bonding layer is titanium. In addition, there is a film thickness tolerance where FWHM when a nickel film thickness is 0.07 μm or more is narrowed like 0.023 μm, and a width at a propagation loss of 30 dB/cm is wide allowable film thickness like a silicon film thickness of 0.10 μm to 0.13 μm. It is effective when the stray light is more required to be removed in case of titanium.

EXAMPLE 2

Figure 10:
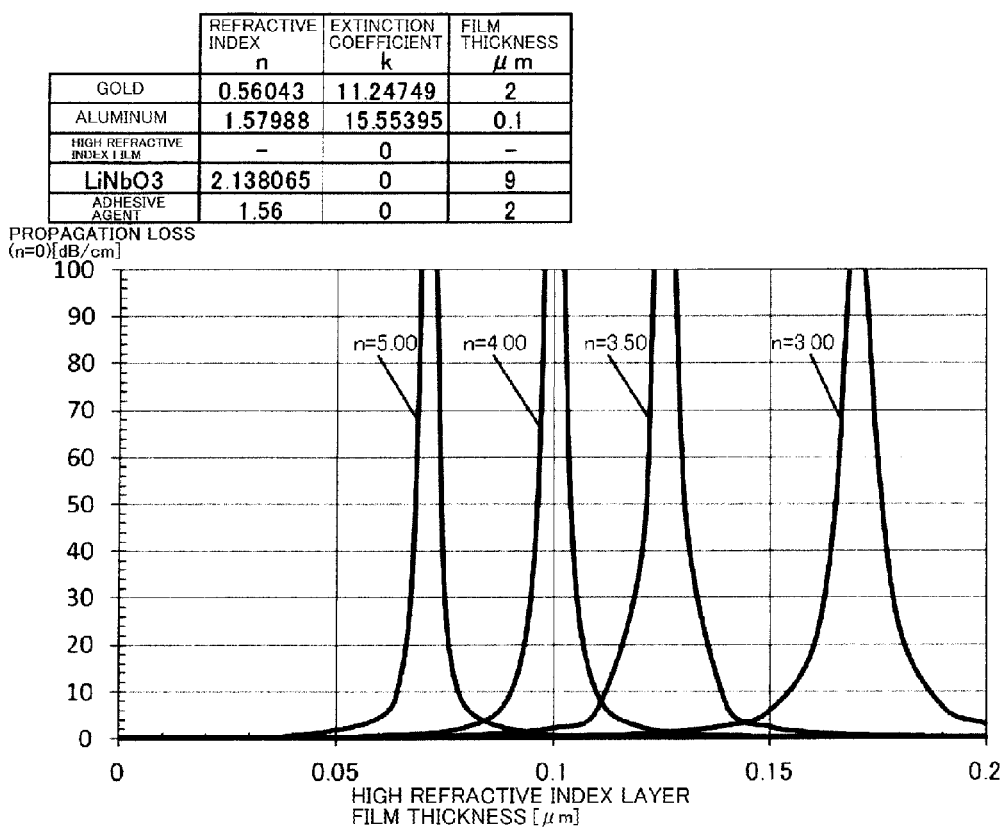
FIG. 10 is a graph illustrating a change of a propagation loss with respect to the film thickness of the high refractive index layer when the bonding layer (the metal layer) is aluminum, and the refractive index of the high refractive index layer is changed.
Figure 11:
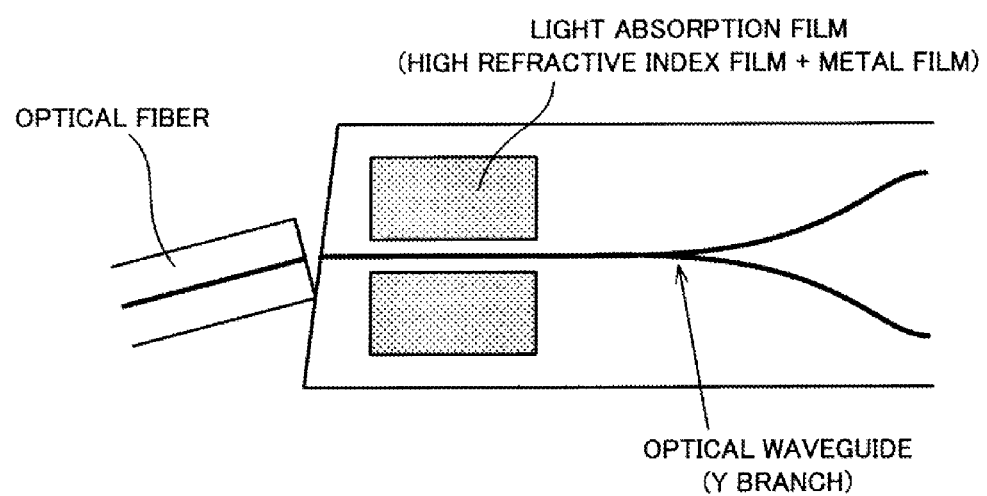
FIG. 11 is a diagram illustrating a configuration for removing fluctuated light component when an optical fiber and an optical waveguide formed on a thin substrate are optically coupled.

The bonding layer of FIG. 3 is changed from titanium to aluminum, an Al film thickness is fixed at 0.10 μm, an LN thin substrate thickness is fixed at 9.0 μm, the refractive index of the high refractive index layer is changed from 3.0 to 5.0, and the propagation loss with respect to a mode in which the number of peaks of the electric field intensity distribution of the light (1550 nm, and the TE mode) propagating in the LN thin substrate is one is preliminarily calculated. From the result illustrated in FIG. 10, the peak becomes steeper compared to the case where the bonding layer is titanium and, in particular, the following characteristics are found.

(1) A peak value of the optical absorption is larger than that of titanium and nickel.

(2) FWHM of an absorption peak is narrower than that of titanium and nickel.

The above configuration is able to be expected effectiveness although an allowable range of manufacturing becomes narrower compared to the case it is insufficient to remove stray light even using the method to deposit silicon, titanium (nickel) and gold in turn on a thinned LN substrate.

EXAMPLE 3

It is known that light coupled to the waveguide on a thin substrate structure from an optical fiber is fluctuated so that it degrades a branching ratio of a Y branch (refer to Japanese Laid-open Patent Publication No. 2008-89875). In order to remove an fluctuated component, the optical absorption film is formed with the distance of 7 μm away from the center of the waveguide, having a length of 5.0 mm. The high refractive index film of the optical absorption film is silicon with a film thickness of 0.07 μm, and the metal film on the silicon is aluminum having a film thickness of 0.1 μm (a state where there is no film on the aluminum). In this configuration, the position of a fiber is moved and a variation of the branching ratio is measured, but the branching ratio is not degraded except only increasing loss. As a result thereof, it is understandable that the optical absorption film effectively removes the fluctuated component.

EXAMPLE 4

Figure 12A:
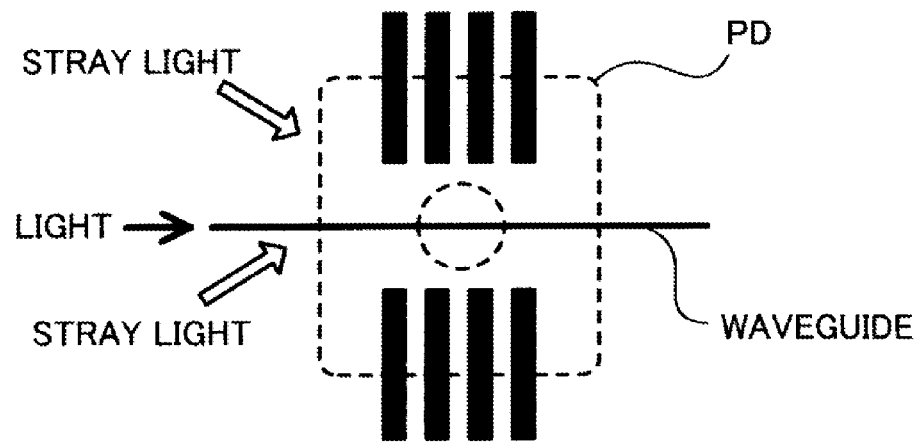
FIGS. 12A and 12B are diagrams illustrating a configuration for removing stray light input to a photo detector (PD) when the photo detector is mounted on the substrate.
Figure 12B:
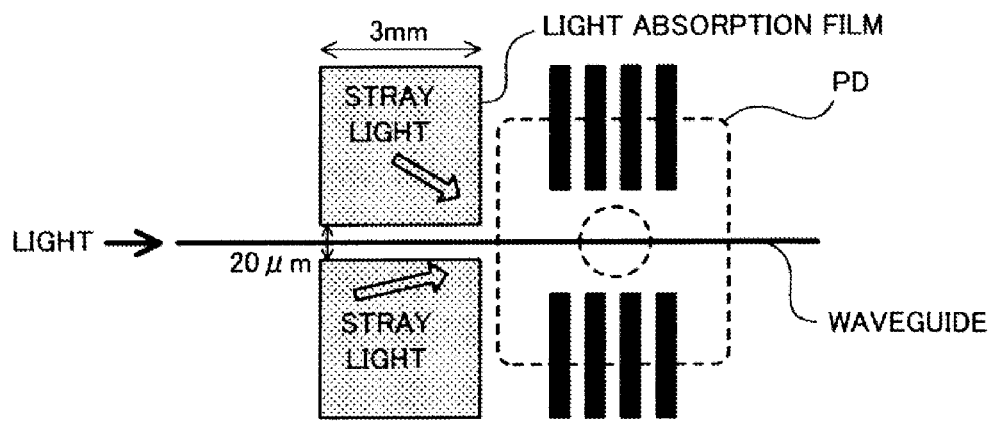
Figure 13:
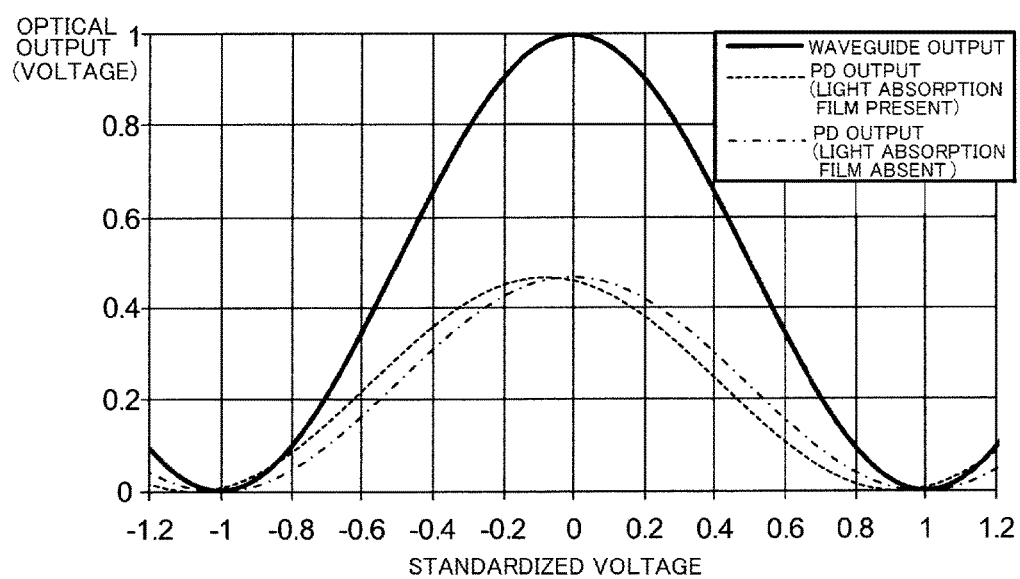
FIG. 13 is a diagram illustrating an optical output from the optical waveguide and a contrast with output detected by the photo detector (PD) with or without the configuration for absorbing the stray light when a normalized voltage (a numerical value 1 indicates a voltage V$\pi$, and an applied voltage is a value divided by the driving voltage V$\pi$) is applied to an intensity modulator.

In an EO conversion device including an MZ structure where it is necessary to adjust a driving bias (Bias) point of the optical modulator, part of the output light is monitored by a photo detector (PD) for Bias control. As a photo detecting method, there is a method in which PD is mounted on the optical waveguide formed on the substrate and evanescent waves are received as described in Japanese Patent No. 4782213. When this method is applied to the optical modulator having a thin substrate structure, light (the stray light) other than the waveguide is also simultaneously received because the thin substrate functions as a slab waveguide (refer to FIG. 12A). Silicon, nickel, and gold are laminated on the area except the optical waveguide in front surface of PD as the optical absorption film described in Example 1 (refer to FIG. 12B). As a result thereof, a phase difference between the light received in PD (incident light is subjected to intensity modulation) and the light propagating in the waveguide is improved from 8% to 0.5% (refer to FIG. 13). Furthermore, in FIG. 13, the intensity modulated light is input to the waveguide. A normalized voltage indicates a value dividing voltage applied to the intensity modulator by $V\pi$. By using this absorption film, the stray light is not mixed, and a phase difference between signal light and monitor light decreases.

EXAMPLE 5

The QPSK modulator is formed of three MZ structures and is that the sub Mach-Zehnder type waveguide (the child MZ) is inserted into 2-branched waveguides of a main Mach-Zehnder type waveguide (a parent MZ), so-called a nest type optical waveguide. When the substrate is a thin substrate, the stray light does not distribute from the thin substrate, and thus the extinction ratio is easily degraded. As described in Japanese Patent Application No. 2012-176628, when a wide angle Y branch is used, light is leaked from a branched point, and thus the extinction ratio is degraded. Recently, a modulator integrated with an MZ structure such as a DP-QPSK modulator is required to be downsized. In Japanese Patent Application No. 2012-176628, the structure in which light leaked from the branched point is guided to area under the electrode and is absorbed by the metal is taken. The above configuration is able to be implemented when interval between the branched waveguides of the parent MZ is wider.

For this reason, when the interval between the branched waveguides of the child MZ is tens of μm, it is difficult to take the structure in which light leaked from the branched point is guided to an area under the electrode. This is because when a waveguide for guiding is inserted into the branched point of the Y branch of the child MZ, an interval between each of the branched waveguides and the waveguide for guiding is a distance which optical coupling occurs.

In addition, in order to downsize an integrated modulator, it is necessary to shorten the Y-branched portion of the child MZ. That is, the wide angle Y branch would be needed. For this reason, the light is more likely to leak from the branched point of the Y branch of the child MZ. In response, by using the optical absorption layer of the invention, it is possible to efficiently absorb the light leaked from the branched point of the Y branch without optical coupling.

Figure 14A:
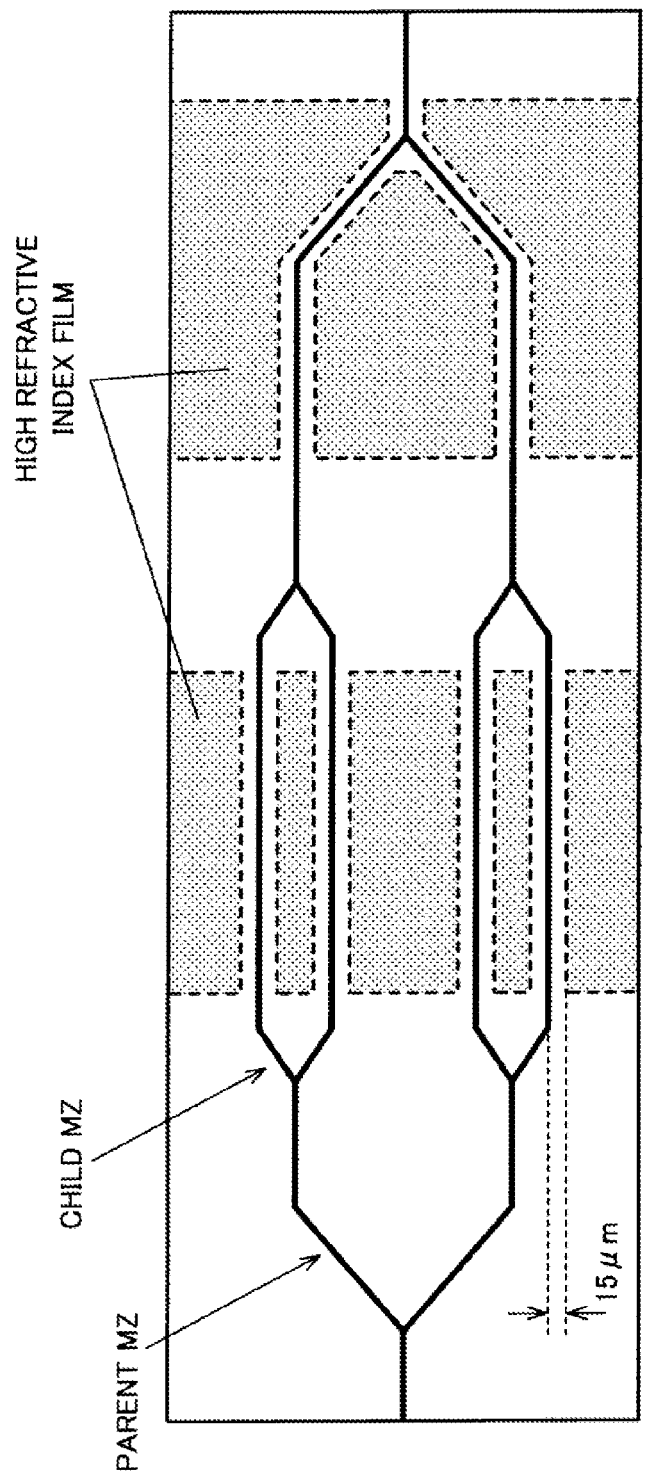
FIGS. 14A and 14B are plan views of an optical waveguide device including a nest type optical waveguide.
Figure 14B:
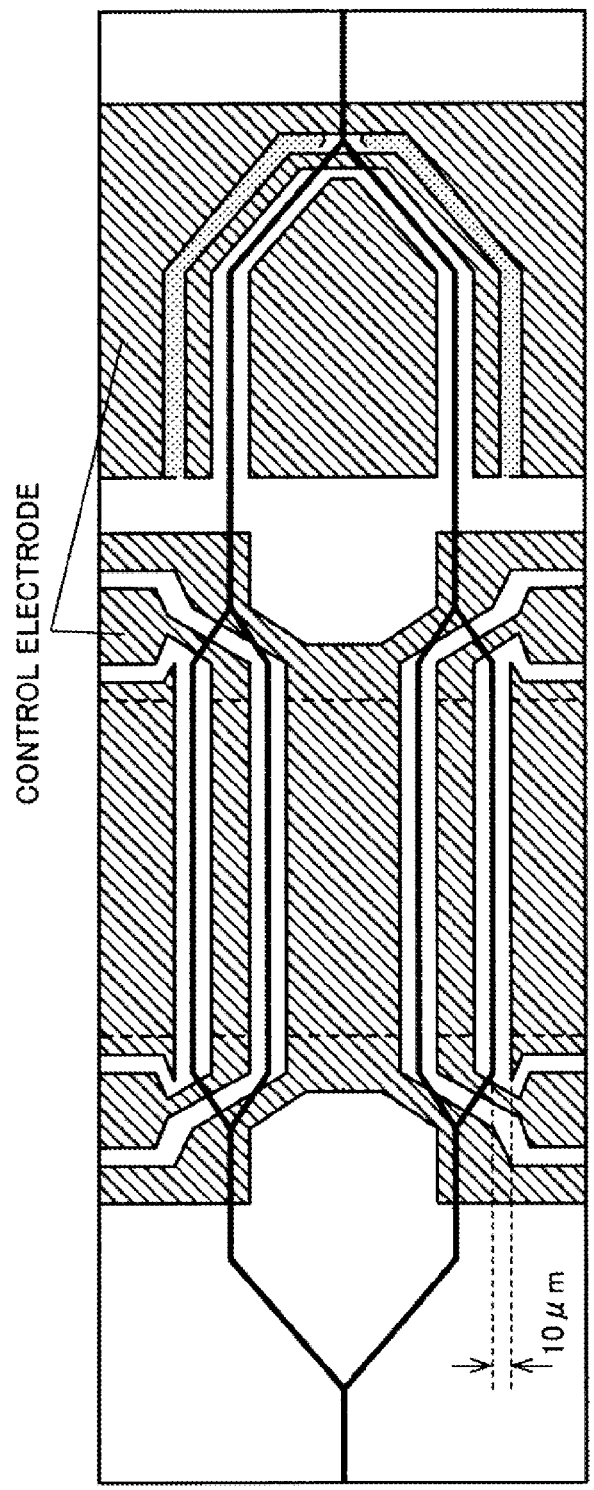

Hereinafter, a QPSK structure will be specifically described as an example. A nest type optical waveguide formed on the thinned LN substrate is prepared. Next, the silicon film with a thickness of 0.11 μm is deposited using a sputtering method. Next, using a photoresist and an etching liquid (KOH, HF, or the like), the high refractive index layer (silicon) which has the pattern structure as illustrated in FIG. 14A is formed. In this step, a distance between the center of the branched waveguide of the child MZ and edge of the silicon is 15 μm. Next, nickel having a film thickness of 0.1 and gold having a film thickness of 0.04 μm are sequentially deposited by vapor deposition. After that, a gold electrode is formed by a semiadditive method. Gold and nickel between the electrodes are removed with iodine and potassium iodide. The formed structure is illustrated in FIG. 14B.

The pattern of silicon does not intersect with the optical waveguide, in particular, the optical waveguide (the main waveguide) propagating the signal light. In addition, the distance between the center of the branched waveguide of the child MZ and edge of the electrode is 10 μM. For this reason, a loss of the optical modulator does not become worse. As a result of evaluating the loss of the optical modulator, the loss of the optical modulator is 5.0 dB or less (when a wavelength of the light waves is from 1520 nm to 1620 nm) and is the same level as that of a case where the high refractive index film is not disposed in the related art. Further, as a result of measuring an extinction ratio, the extinction ratio is significantly improved like 40 dB or more (in the related art, 25 dB or more).

Even though it is not illustrated in FIG. 14, a Y-junction of each MZ is a 3-branched coupler in which waveguides for unnecessary light are arranged so as to interpose an output waveguide. For this reason, when the thinned substrate is used, the structure in which the waveguide for unnecessary light in a 3-branched portion of the child MZ terminates (electrode absorption) inside the parent MZ, the optical absorption at the termination using the electrode is insufficient in the related art.

Furthermore, in the invention, the "main waveguide" indicates a waveguide which is optically connected to an input waveguide inputting light and an output waveguide outputting the light like the optical waveguide in which the signal light propagates. In addition, the waveguide for unnecessary light indicates a waveguide which is optically connected to neither the input waveguide nor the output waveguide. For example, the waveguides on both sides of the 3-branched waveguide are not optically connected to the output waveguide, and thus are the waveguides for unnecessary light.

As the optical absorption using the termination of the waveguide for unnecessary light is insufficient, a method in which a part of the 3-branched portion of the child MZ is guided to outside of the parent MZ is also proposed (refer to Japanese Laid-open Patent Publication No. 2012-078508). However, in the method, it is not possible to remove (extinct) the light, and thus there is a possibility that the unnecessary light may couples to the main waveguide. In particular, the optical absorption becomes extremely weak like 4.0 dB/cm in case that a material for the bonding layer (the metal layer) is titanium, 1.0 dB/cm in case of nickel, and 0.2 dB/cm in case of aluminum, when the material for the electrode is gold.

Figure 15:
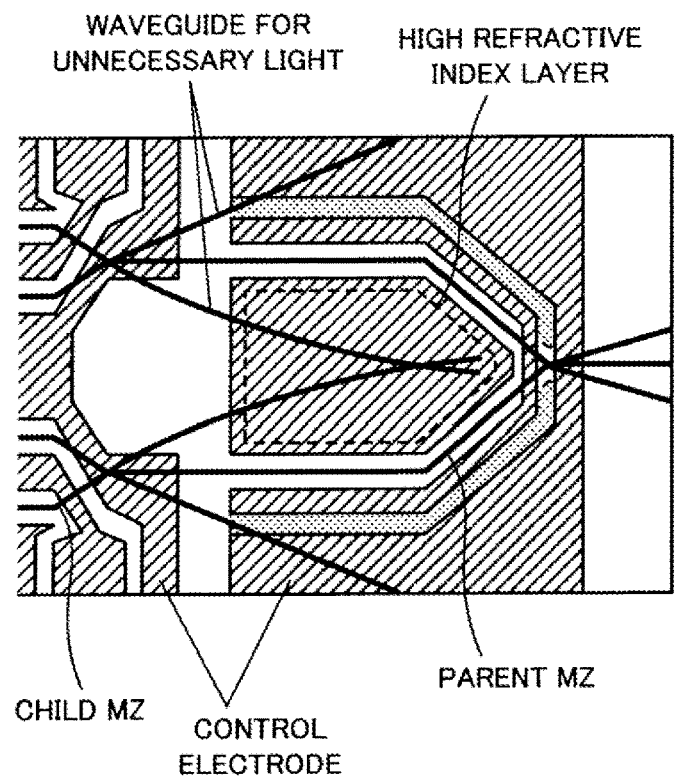
FIG. 15 is a diagram illustrating a configuration in which 3-branched waveguides in which waveguides for unnecessary light are disposed in a Y-junction of the sub Mach-Zehnder type waveguide and end of the waveguides for unnecessary light remains the region of main Mach-Zehnder type waveguide.

However, using the invention, it is possible to increase the absorption efficiency to 10 times or more of that in the related art at the termination of the waveguide for unnecessary light by using the high refractive index layer arranged under the electrode (the bonding layer) as illustrated in FIG. 15. For this reason, it becomes possible to terminate the waveguide for unnecessary light of the 3-branched waveguide of the child MZ inside the parent MZ.

EXAMPLE 6

When a buffer (BF) layer, an electric charge dispersion film, or the like is not disposed between the electrodes of the LN modulator, the surface of the LN substrate is exposed. For this reason, when a foreign substance is attached onto the optical waveguide, there is a case that a variation in properties of the optical modulator occurs as the foreign substance becomes a scattering source of the light. Further, impurities between the electrodes may become a degradation factor for drift.

Figure 16:
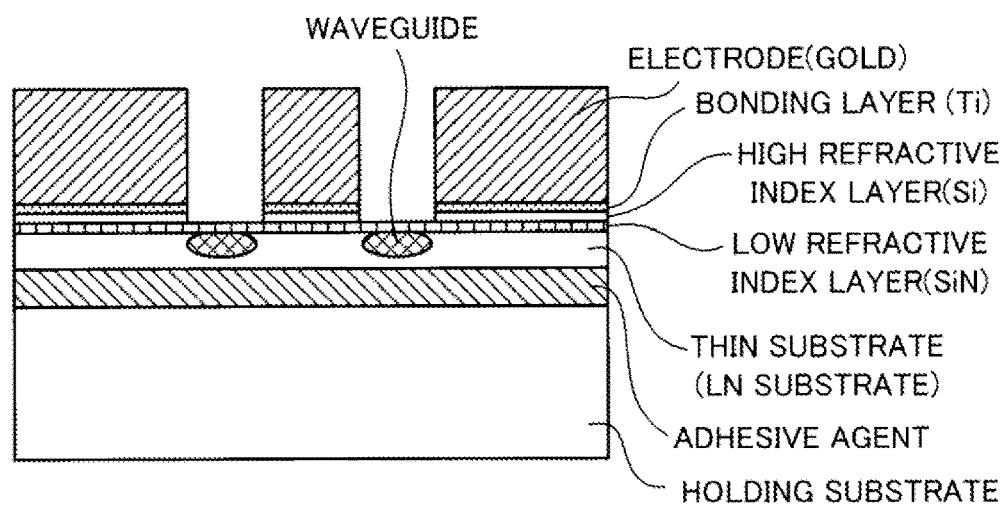
FIG. 16 is a cross-sectional view illustrating an example in which a low refractive index layer is arranged between the thinned substrate and the high refractive index layer.

In consideration of this, the structure in which silicon nitride ($Si_3N_4$: n=1.98938, and k=0 @ 1.55 μm) as a low refractive index film is formed on the LN substrate and then the high refractive index film (Si), Ni, and Au are sequentially deposited is considered (refer to FIG. 16). At this time, fixing each film thickness is 0.1 μm thickness for the bonding layer (Ni), 1.0 μm or more thickness for the electrode (Au) and 9.0 μm of the LN substrate and changing the thickness of both the low refractive index film and the high refractive index layer, an effectiveness of inserting the low refractive index film is confirmed (refer to FIG. 17).

Figure 17:
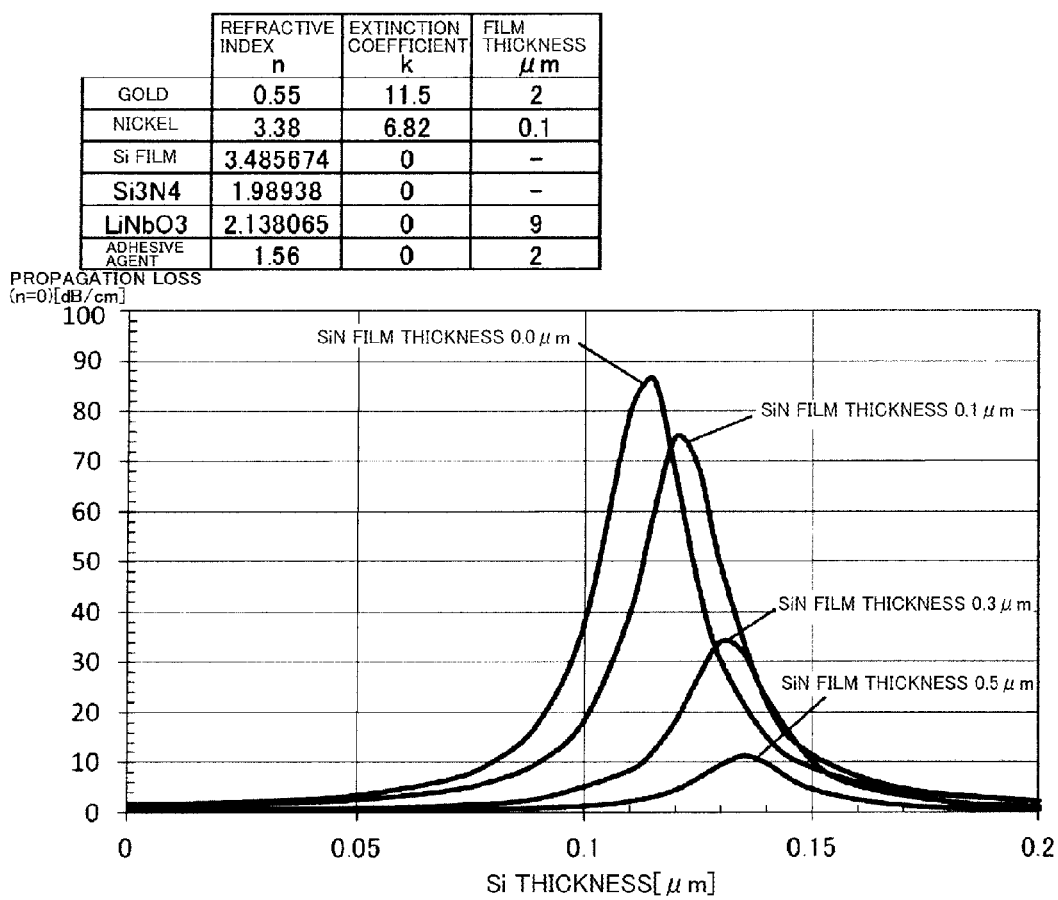
FIG. 17 is a graph illustrating a change of a propagation loss with respect to the thickness of silicon (the high refractive index layer) when the thickness of silicon nitride (the low refractive index layer) is changed.

FIG. 17 illustrates a change of propagation loss with respect to a change in the thickness of the high refractive index layer (Si) in case the film thickness of the low refractive index film (a SiN film) is 0 (the SiN film is not disposed), 0.1 μm, 0.3 μm, or 0.5 μm. The used light wave is a wavelength of 1.55 μm and TE mode.

As a result thereof, it is found that the thickness of the low refractive index film when the propagation loss is 1/e normalized by the condition without low refractive index film is approximately 0.35 μm. In this regard, the propagation loss which is the same level as the case that the bonding layer (the metal layer) is made of titanium is made as the reference. For this reason, a relationship between the low refractive index film thickness and the refractive index when the propagation loss is a value larger than 1/e is as follows.

$$(n_{low} \cdot t_{low})/\lambda \leq 0.45$$

Here, $n_{low}$ is the refractive index of the low refractive index layer, $t_{low}$ is the film thickness of the low refractive index layer (a unit of μm), and λ is the main wavelength of the light waves propagating in the main waveguide (a unit of μm).

EXAMPLE 7

As described above, although the thin substrate structure which has most effectiveness is primarily described, it is also effective in case of the optical modulator having a bulky structure. Hereinafter, examples thereof will be described.

The radiation light from the Y-junction of the optical modulator having a bulky structure is able to be used for bias (Bias) control. On the other hand, an optical coupling loss between an optical fiber (a symmetric light distribution) and an LN chip (an asymmetric light distribution) is approximately 1.0 dB/port, and light which is not coupled propagates in the LN chip as a waveguide (a high order mode waveguide).

Figure 18:
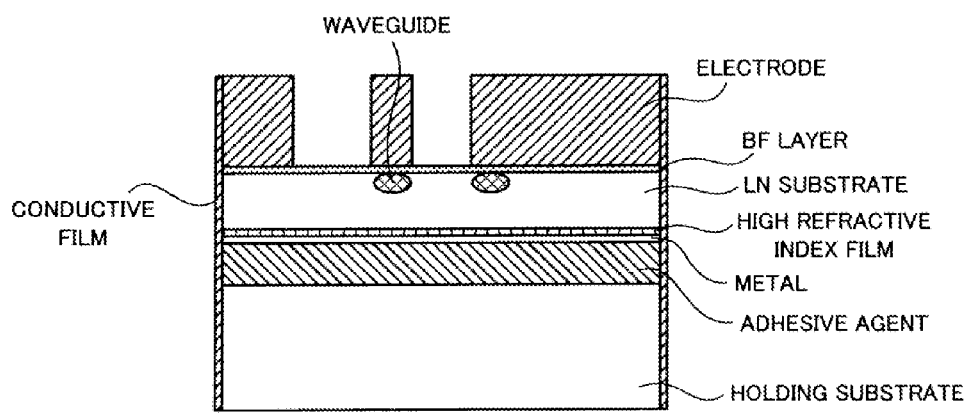
FIG. 18 is a cross-sectional view illustrating an example in which an optical absorption film is formed on a back surface of the substrate.

For this reason, the case that the radiation light is tried to be received, uncoupled light between the fiber and the chip at input side is also mixed so that characteristics degradation is unavoidable. However, as illustrated in FIG. 18, it is possible to receive only radiation light because it is possible to effectively absorb uncoupled light between the fiber and the chip by forming optical absorption film of the invention (the high refractive index layer+the metal layer) on a back surface or a side surface of the LN chip. In particular, in order to widen the bandwidth of the optical modulator, when the thickness of the substrate is 0.2 mm or less, the effect is remarkable. Obviously, metal on the back surface of the LN chip becomes a floating electrode in case there is no electric connection, and thus it is necessary to be connected to a ground electrode by a method of forming a conductive film on the side surface thereof, or the like.

EXAMPLE 8

Figure 19:
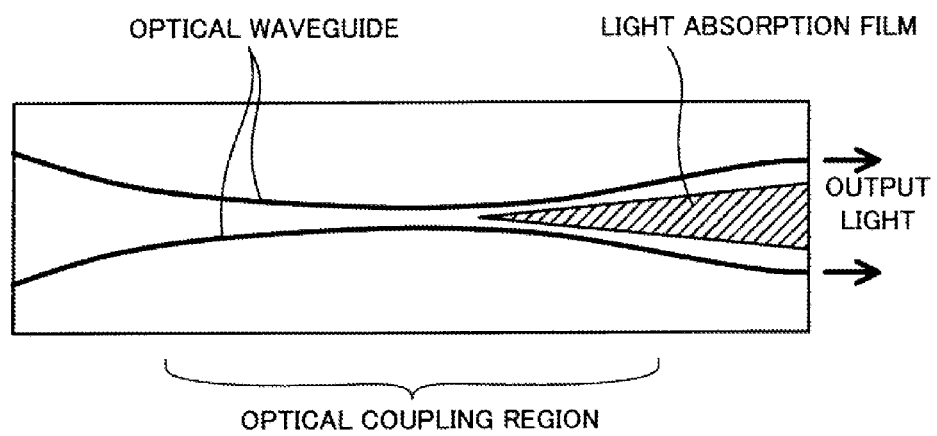
FIG. 19 is a diagram illustrating a structure in which the optical absorption film is formed between the optical coupling waveguides.

As illustrated in FIG. 19, the optical absorption film configured of both the high refractive index film and the metal film is formed between waveguides in a directional coupler, a coupler, or the like formed on the surface of the substrate. A distribution ratio of the directional coupler or the coupler of the related art is varied by a process variation, but by arranging the optical absorption film, it is possible to control the coupling length. That is to say, it is not adjustment of an effective refractive index in the related art but adjusting the coupling length by absorbing an optically coupled component. In addition, when the distribution ratio is different from a desired value, by removing (trimming) a part of the high refractive index film or the metal film with a laser such as a YAG laser, it is possible to shift the distribution ratio to a desired distribution ratio.

Example 9

Figure 20:
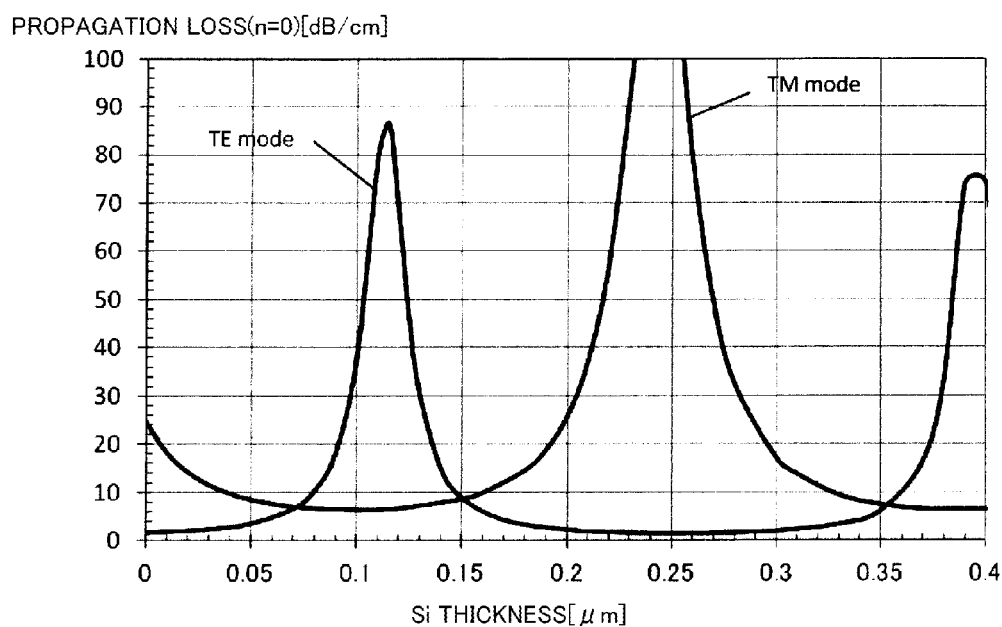
FIG. 20 is a graph illustrating a propagation loss of each polarized wave (a wavelength of 1.55 μm) with respect to the thickness of silicon when silicon (the high refractive index layer), nickel (the bonding layer or the metal layer), and gold (the electrode) are arranged on the optical waveguide.

In the LN modulator, a photo detector (PD) for bias point control is generally built-in. An signal which is inverted against a main signal is received by the PD not to affect an optical loss. By using an intersection waveguide type coupler as described in Japanese Patent No. 4719135, light from the other end of the output waveguide is received by a PD. The waveguide guiding the light waves to the PD is formed on the substrate, and the optical absorption film of the invention is arranged on a part of the waveguide as an optical output intensity adjustment mechanism (an attenuation portion). Accordingly, the amount of the received light by the PD is adjusted to an optimum amount. As illustrated in FIG. 20, by using the optical absorption film of the invention as the optical output intensity adjustment mechanism, any one of TE/TM polarization is able to be used. That is, as illustrated in FIG. 20, it is found that light of the TE mode or the TM mode is selectively absorbed by adjusting the film thickness of silicon which is the high refractive index layer. When the PD is changed to an inexpensive member or when the PD sensitivity is changed, it is sufficient to remove a part of a film body of the optical output intensity adjustment mechanism with a YAG laser or the like, and it is not necessary to change a design of the LN chip side.

In the above description of the invention, silicon is primarily described as the high refractive index film of the optical absorption film. Silicon and metal forms a silicide alloy due to the thermal history thereof. For example, silicon and aluminum form an aluminum-silicon-based alloy, and aluminum and gold form an alloy at approximately 100° C. By forming such an alloy, the amount of optical absorption by the optical absorption film is changed.

Figure 21:
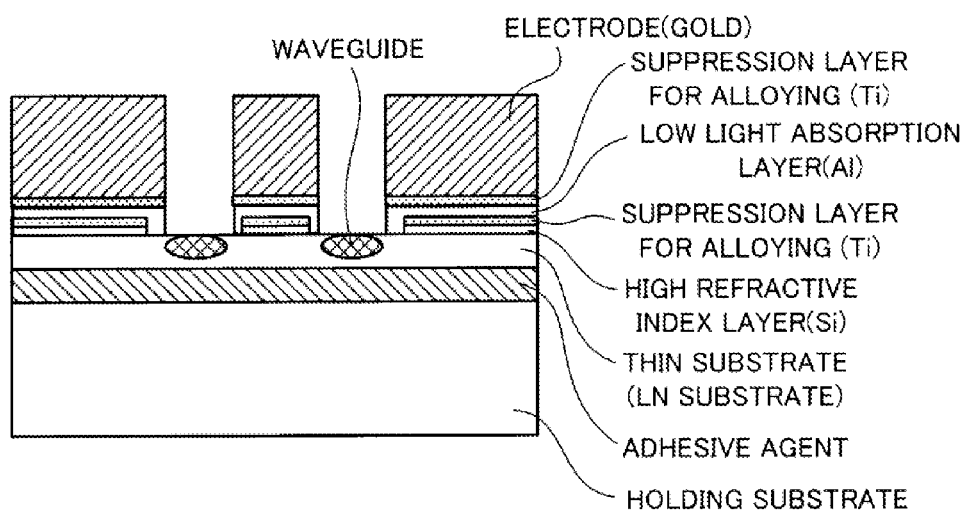
FIG. 21 is a diagram illustrating an example of a configuration which achieves both "removal of the stray light by using the optical absorption film" and "suppression of the absorption caused by the bonding layer on the optical waveguide (suppression of loss increase)".

In order to comparatively stabilize the optical absorption, as illustrated in FIG. 21, it is necessary that a layer which suppresses alloying is arranged or a material which is rarely alloyed is selected. As described above, the high refractive index film is silicon, the bonding layer (the metal film) is titanium, and the electrode is gold as a specific example, and thus it is possible to suppress an alloy reaction up to approximately 300° C.

In addition, in order to satisfy both "removal of the stray light by using the optical absorption film" and "absorption suppression by using the bonding layer on the optical waveguide (suppression of loss increase)", it is possible to be silicon for the high refractive index film, aluminum for the bonding layer (the metal film), and gold for the electrode. The absorption caused by the bonding layer on the optical waveguide occurs at an intersection between the control electrode and optical waveguide in FIG. 14 or by being the optical waveguide closer to the bonding layer (a propagation loss caused by titanium is 4.0 dB/cm, and a propagation loss caused by aluminum is 0.2 dB/cm). In this case, as illustrated FIG. 21, by inserting the suppression layer for alloying, it is possible to suppress the change of optical absorption amount by forming an alloy with the optical absorption film.

As described above, according to the invention, it is possible to provide an optical waveguide device which is able to efficiently absorb or remove leaked light propagating in a substrate.

What is claimed is:

1. An optical waveguide device comprising:
   a substrate of X-cut;
   an optical waveguide formed on the substrate;
   a high refractive index layer having a refractive index higher than a refractive index of the substrate and contacting the substrate; and
   a metal layer, wherein
   the optical waveguide comprises a main waveguide in which signal light of TE mode propagates,
   the substrate has an interaction region in which the main waveguide is formed between electrodes of the optical waveguide device and in which the electrodes apply an electric field to the main waveguide,
   in a region of the substrate in which the main waveguide is not formed, the high refractive index layer is interposed between the substrate and the metal layer, and the high refractive index layer removes a stray light propagating through the substrate,
   in the other region of the substrate in which the main waveguide is formed and a part of the metal layer is arranged on the main waveguide, the high refractive index layer is removed from the substrate, and
   the high refractive index layer has a thickness that is between 0.06 μm to 0.16 μm, a refractive index that is 3.485674 or greater and a distance from a center of the main waveguide that is 15 μm or greater.

2. The optical waveguide device according to claim 1, wherein the electrodes are formed on the metal layer.

3. The optical waveguide device according to claim 1, wherein the substrate is a thin substrate having a thickness of 200 μm or less, and a holding substrate is fixed to the thin substrate.

4. The optical waveguide device according to claim 1, wherein the substrate is formed of a material having an electro-optic effect.

5. The optical waveguide device according to claim 1, wherein the main waveguide is a nest type optical waveguide in which each sub Mach-Zehnder type optical waveguide is incorporated into two branch waveguides of a main Mach-Zehnder type waveguide.

6. An optical waveguide device comprising:
   a substrate of X-cut;
   an optical waveguide formed on the substrate,
   a high refractive index layer having a refractive index higher than a refractive index of the substrate; and
   a metal layer, wherein
   the optical waveguide comprises a main waveguide in which signal light of TE mode propagates,
   the substrate has an interaction region in which the main waveguide is formed between electrodes of the optical waveguide device and in which the electrodes apply an electric field to the main waveguide,
   in a region of the substrate in which the main waveguide is not formed,
   the high refractive index layer is interposed between the substrate and the metal layer,
   the high refractive index layer removes a stray light propagating through the substrate, and
   a low refractive index layer having a refractive index lower than the refractive index of the substrate is arranged between the substrate and the high refractive index layer and contacting the substrate,
   in the other region of the substrate in which the main waveguide is formed and a part of the metal layer is arranged on the main waveguide, the high refractive index layer is removed from the low refractive index layer,
   the high refractive index layer has a thickness that is between 0.06 μm to 0.16 μm, a refractive index that is 3.485674 or greater and a distance from a center of the main waveguide that is 15 μm or greater, and
   the low refractive index layer satisfies the following conditions:

$$(n_{low} \cdot t_{low})/\lambda \leq 0.45$$

$n_{low}$ is the refractive index of the low refractive index layer,
   $t_{low}$ is a film thickness of the low refractive index layer (a unit of μm), and
   $\lambda$ is a main wavelength (a unit of μm) of the light waves propagating through the main waveguide.

7. The optical waveguide device according to claim 6, wherein the substrate is a thin substrate having a thickness of 200 μm or less, and a holding substrate is fixed to the thin substrate.

8. The optical waveguide device according to claim 6, wherein the substrate is formed of a material having an electro-optic effect.

9. The optical waveguide device according to claim 6, wherein the electrodes are formed on the metal layer.

10. The optical waveguide device according to claim 6, wherein the main waveguide is a nest type optical waveguide in which each sub Mach-Zehnder type optical waveguide is incorporated into two branch waveguides of a main Mach-Zehnder type waveguide.

* * * * *